Figure 1:
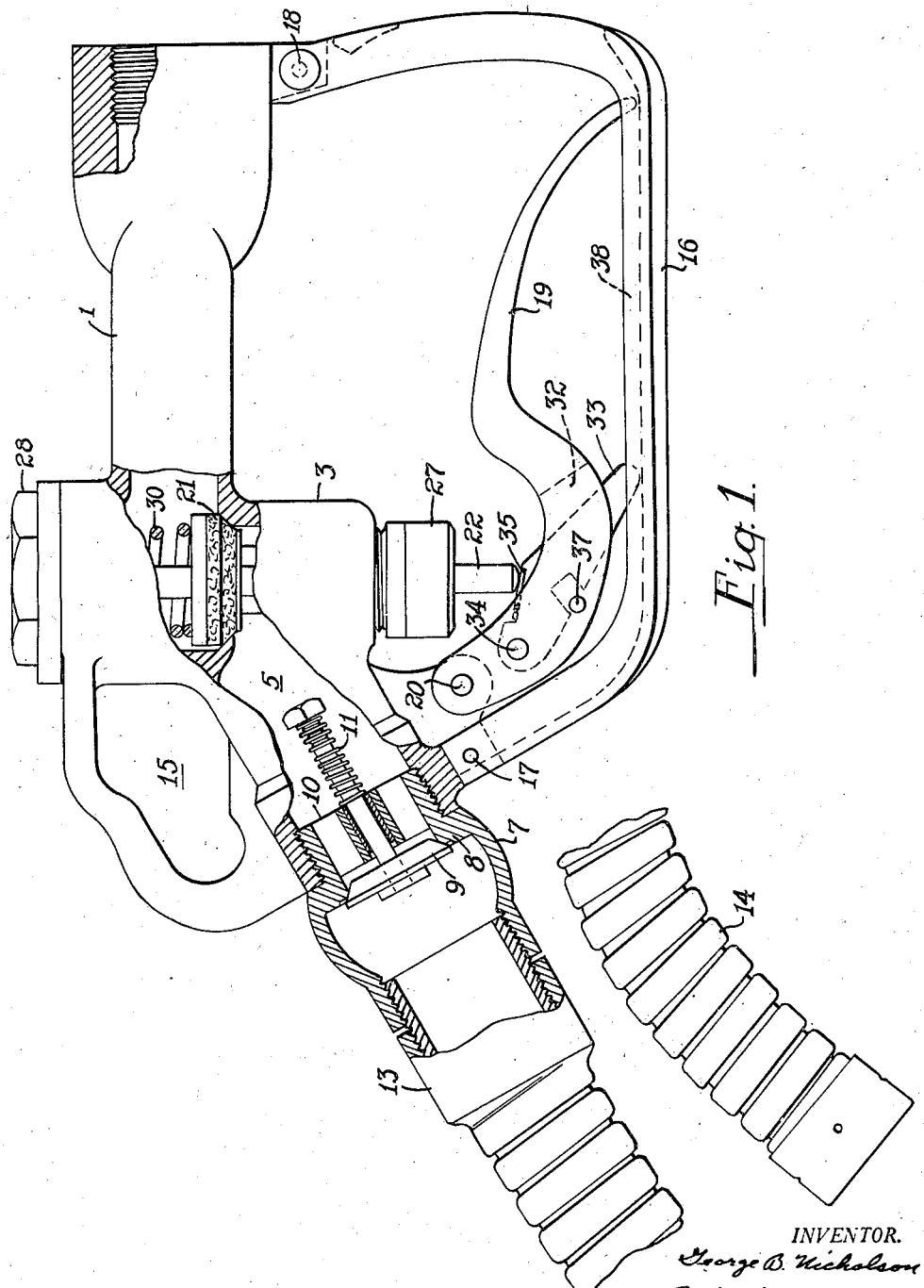

April 12, 1938.  G. B. NICHOLSON  2,113,853
FLUID DISPENSING NOZZLE VALVE
Filed Feb. 23, 1937  2 Sheets-Sheet 1

INVENTOR.
George B. Nicholson
BY William B. Jaspert
ATTORNEYS.

Patented Apr. 12, 1938

2,113,853

UNITED STATES PATENT OFFICE 2,113,853

FLUID DISPENSING NOZZLE VALVE

George B. Nicholson, Erie, Pa.

Application February 23, 1937, Serial No. 127,146

4 Claims. (Cl. 137—139)

This invention relates to new and useful improvements in nozzle valves for gasoline dispensing pumps or the like, and it is among the objects thereof to provide a nozzle with a manually operated valve construction which shall be especially suited for controlling the flow of the fluid from the nozzle end when caution is required to prevent overflow of the receiving container or tank.

Another object of the invention is the provision of a valve structure for fluid dispensing nozzles which shall have a variable leverage acting upon the control valve with a greater leverage for slow flow operations than at full or maximum flow.

Figure 2:
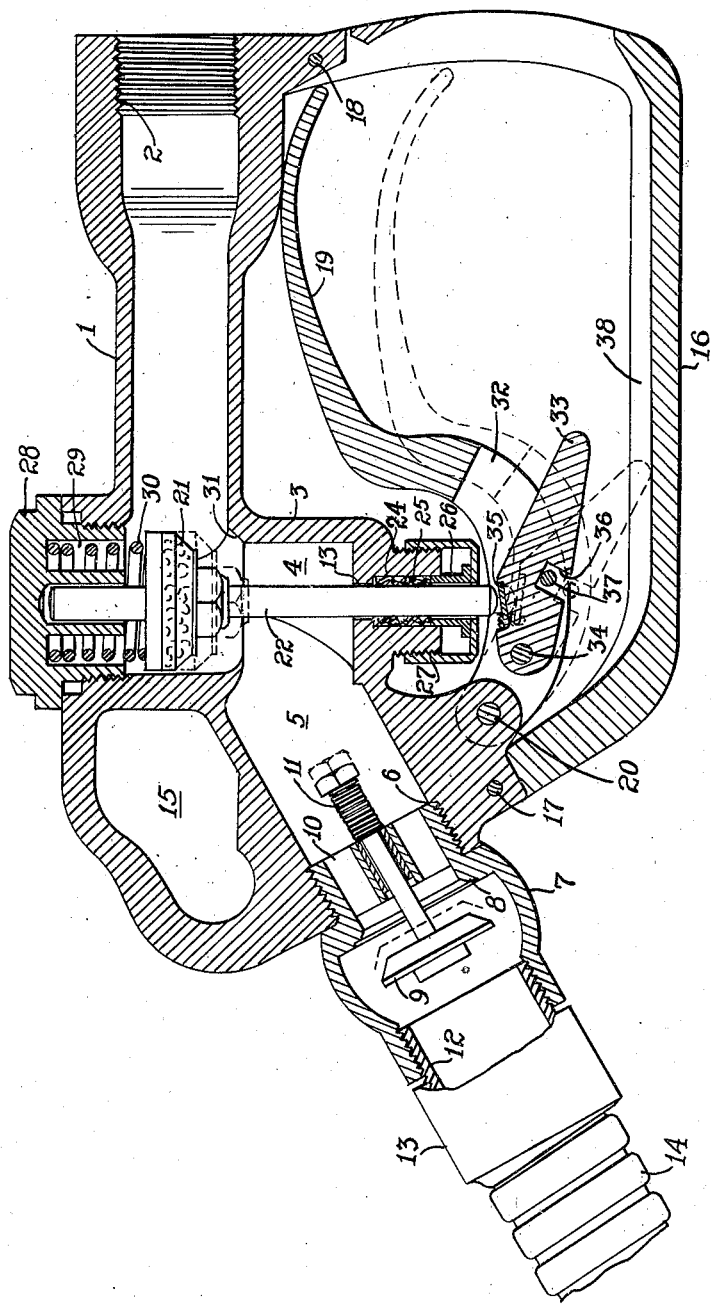

These and other objects of the invention will become more apparent from a consideration of the accompanying drawings constituting a part hereof in which like reference characters designate like parts and in which:

Fig. 1 is a view partially in section and partially in side elevation of a fluid dispensing nozzle and valve embodying the principles of this invention; and Fig. 2 a vertical cross-sectional view of the valve and control lever thereof.

With reference to the several figures of the drawings, the structure therein illustrated comprises a conduit portion 1 having a threaded fitting 2 for connection with a fluid delivery hose conduit. The member 1 has an enlarged portion 3 forming a valve chamber generally designated by the reference numeral 4 from which a divergent flow passage 5 extends with a threaded fitting 6 for receiving a nipple 7 having a shoulder 8 forming a chamfered valve seat for a valve 9 which is mounted in a spider 10 and biased by a coil spring 11 to normally engage its seat on shoulder 8. The nipple 7 is connected by a nipple 12 to a nozzle 13 having the usual armored flexible nozzle end 14. The conduit casting 1 is provided with an eyelet 15 to pass over a hook or lever arm of gasoline dispensing pumps as is common practice.

The bottom portion of the conduit casting 1 is provided with a guard 16 riveted to the conduit frame at 17 and 18 and a valve operating lever 19 is pivoted to a lug portion of the casting 1 at 20.

The main operating valve of the dispensing nozzle comprises a valve 21 mounted on a stem 22 disposed through an opening 23 in the bottom of the enlarged portion 3, the latter being counterbored or recessed at 24 to receive a packing gland 25 which is compacted by a bushing 26 disposed around the valve stem 22 and held in position by a knurled nut 27 to project therebeneath. The valve 21 is accessible by the removal of a cap 28 having an annular recess 29 for receiving a coil spring 30 which abuts the upper part of the valve 21 to normally bias it downwardly against its seat 31.

The operating lever 19 is slotted at 32 to receive a lever 33 which is pivoted to the operating lever at 34, lever 33 being provided with a contact or wearing plate 35. The lever 33 is further provided with a notch or slot 36 which cooperates with a pin 37 extending transversely of the slot 32 of the operating lever 19. Fig. 1 illustrates the normal position of the operating lever 19 and what may be termed the cam lever 33, the latter abutting against the recessed portion or groove 38 of the guard, in which the operating lever rests with its tip in the bottom of the groove 38. In the position of the levers as shown in Fig. 1, both valves 9 and 21 are in their normally closed position, so held by their respective coil springs 11 and 30, and valve stem 22 extends the maximum distance downwardly from the knurled bushing 27. To start flow of fluid through the nozzle end 14, the operator grips the valve by placing the palm of the hand above the conduit portion 1 and extending the fingers around and beneath the operating lever 19. During the initial movement of the latter, the cam lever 33 is raised at its pivot point 34 and the bottom end or tip of lever 33 resting against the bottom of groove 38 of guard 16 acts as a fulcrum which develops a greater leverage against the bottom of the valve stem 22 than if the latter were directly contacting the main operating lever 19. This leverage is available only during the travel of the operating lever within the limits of clearance of the pin 37 in the slot 36, and when pin 37 abuts against the lever 33 in the bottom of the slot 36, it will lift lever 33 with it for the remainder of the movement of the operating lever 19 until the latter abuts the conduit portion 1. As shown in the drawings, the leverage of the operating lever 19 is about four to one with the bottom of valve stem 22 as the fulcrum point. During the initial movement of the operating lever, however, the leverage is multiplied through the cam lever 33 to obtain about 30% more leverage, thus clearly minimizing the force required to operate the main lever 19.

By thus multiplying the leverage for moving the valve stem 22 during its initial opening of the main control valve 21, the operator with very little effort can obtain more sensitive control of the valve 21, which is highly desirable to prevent overflow of the receiving tank when it is nearly full.

It is evident that when the main valve 21 is lifted from its seat 31, the force of the fluid passing through conduit 1 and through the valve chamber 4 will unseat valve 9 and permit fluid flow through the dispensing nozzle 14.

It is evident from the foregoing description of this invention that nozzle valves for fluid dispensing pumps or pressure lines made in accordance therewith facilitate the accurate and safe dispensing of fluids, particularly gasoline around filling stations where it is undesirable and dangerous to permit any overflow.

Although one embodiment of the invention has been herein illustrated and described, it will be apparent to those skilled in the art that various modifications may be made in the details of construction without departing from the principles herein set forth.

I claim:

1. In a fluid dispensing nozzle valve, an operating valve having a valve stem projecting from the valve chamber, an operating lever for actuating said stem, a secondary lever pivoted at one end to said operating lever for engaging said stem, and a stationary abutment for said secondary lever constituting a fulcrum for the free end of said lever during partial movement of the operating lever.

2. In a fluid dispensing nozzle valve, an operating valve having a valve stem projecting from the valve chamber, an operating lever for actuating said stem, said lever being slotted in the region of the valve stem, a second lever disposed in the slot of the operating lever and being pivoted thereto for engaging the end of the valve stem, means on the operating lever for engaging the second named lever to interlock said levers in response to movement of the operating lever and a stationary abutment for said secondary lever constituting a fulcrum for the free end of said lever during partial movement of the operating lever.

3. In a fluid dispensing nozzle valve, an operating valve having a valve stem projecting from the valve chamber, an operating lever for actuating said stem, a second lever pivoted to said operating lever for engaging the end of the valve stem in response to movement of the operating lever, means on the operating lever coacting with the second named lever for interlocking said levers during partial movement of the operating lever and a stationary abutment for said secondary lever constituting a fulcrum for the free end of said lever during partial movement of the operating lever.

4. In a fluid dispensing nozzle valve, an operating valve having a valve stem projecting from the valve chamber, an operating lever for actuating said stem, said lever having a slotted opening beneath the valve stem, a second lever disposed in said opening and pivoted to the operating lever, a stationary abutment for said second named lever constituting a fulcrum for the free end of said lever, said second named lever having a slot for engagement by a pin provided in the operating lever whereby during partial travel of the latter the second named lever is fulcrumed at one end to multiply the leverage acting upon the valve stem and during the remainder of its movement is interlocked with the operating lever to displace the valve stem.

GEORGE B. NICHOLSON.